United States Patent [19]

Rawlings

[11] Patent Number: 5,034,812
[45] Date of Patent: Jul. 23, 1991

[54] IMAGE PROCESSING UTILIZING AN OBJECT DATA STORE TO DETERMINE INFORMATION ABOUT A VIEWED OBJECT

[75] Inventor: Keith C. Rawlings, Cheltenham, England

[73] Assignee: Smiths Industries Public Limited Company, London, England

[21] Appl. No.: 432,936

[22] Filed: Nov. 7, 1989

[30] Foreign Application Priority Data

Nov. 14, 1988 [GB] United Kingdom ............... 8826550

[51] Int. Cl.$^5$ ............................................. H04N 7/18
[52] U.S. Cl. .................................. 358/108; 358/107; 358/109
[58] Field of Search ............ 358/108, 109, 107, 128, 358/126, 103; 356/3, 4, 5; 340/541, 552

[56] References Cited

U.S. PATENT DOCUMENTS

| | | | |
|---|---|---|---|
| 4,249,207 | 2/1981 | Harman et al. | 358/105 X |
| 4,391,514 | 7/1983 | Webster | 358/109 X |
| 4,679,077 | 7/1987 | Yuasa et al. | 358/108 |
| 4,700,223 | 10/1987 | Shoutaro et al. | 358/108 X |
| 4,709,264 | 11/1987 | Tamura et al. | 358/93 |
| 4,872,051 | 10/1989 | Dye | 358/107 X |
| 4,908,704 | 3/1990 | Fujioka et al. | 358/108 |

FOREIGN PATENT DOCUMENTS 2165714 4/1986 United Kingdom.

*Primary Examiner*—Victor R. Kostak
*Attorney, Agent, or Firm*—Pollock, Vande Sande and Priddy

[57] ABSTRACT

Apparatus for processing the image seen by a television camera viewing the surroundings of an aircraft has a store of topographical mapping information and object data stores which contain information about the appearance, location and size of objects in the area to be viewed. The apparatus derives information as to the location of an object in the field of view and determines where the line of sight of the object from the camera intercepts the stored topographical mapping. The range of the object is determined trigonometrically from its location relative to a corresponding part of the stored topographical mapping and the position of the aircraft. New objects are indicated when they are not present in the object data stores. The angle subtended by an identified object is compared with the known size of the object to provide another indication of range. An indication of the size of the object can be provided from knowledge of its range and the angle subtended.

11 Claims, 5 Drawing Sheets

5,034,812

IMAGE PROCESSING UTILIZING AN OBJECT DATA STORE TO DETERMINE INFORMATION ABOUT A VIEWED OBJECT

BACKGROUND OF THE INVENTION

This invention relates to image processing apparatus and methods.

The invention is more particularly concerned with image processing apparatus and methods for use in determining the range and or alternatively the size of an object.

Conventional techniques of measuring the range of an object involve the use of a laser or radar rangefinder. While these can be accurate, they have the disadvantage that they must be precisely aimed and can make the presence of the observer apparent. It is common practice for tanks and military aircraft or vessels to be equipped with laser and radar detectors so that an alarm is given when they are under observation by laser or radar radiation. The detector can be used to direct counter-measures at the laser or radar source which is used to provide a homing beacon for a missile or the like.

It would, therefore, be a considerably advantage to be able to measure the range and size of an object remotely in a passive way without increasing the risk of detection.

BRIEF SUMMARY OF THE INVENTION

It is an object of the present invention to provide apparatus and a method that can be used to overcome the above-mentioned disadvantages.

According to one aspect of the present invention there is provided image processing apparatus, including store means arranged to store topographical mapping information about an area to be viewed, sensor means arranged to view at least a part of the area in perspective and to derive information as to the location of an object in the field of view of the sensor means, means for determining where the line of sight of the object from the sensor means intercepts the stored topographical mapping, and the apparatus being arranged to determine the range of the object from its location relative to a corresponding part at least of the stored topographical mapping.

The apparatus may include object data store means containing information about the objects in the area to be viewed, and means for comparing an output from the sensor means with the object data store means to identify an object viewed and to provide an output of the information in the store means in accordance therewith. The means for comparing may be arranged to provide an output in respect of any new object viewed but not present in the data store means. The information in the object data store means may include information about the location of objects in the area, the apparatus including means for providing information in respect of the location of the sensor means, and the apparatus being arranged to provide an indication of the range of the identified object by trigonometry calculation from the information about the location of the object and the location of the sensor.

The object data store means preferably contains information about the size of the objects in the area, the apparatus being arranged to derive an indication of the angle subtended by the identified object at the sensor means, and the apparatus being arranged to provide an indication of the range of the object from information regarding its size and the angle subtended.

The apparatus may include means for deriving an indication of the angle subtended by the object at the sensor means, and the apparatus being arranged to provide an indication of the size of the object from information about the angle subtended and the range of the object from the sensor means. The apparatus may include display means, the display means being arranged to provide a display representation of the range of the object.

According to another aspect of the present invention there is provided image processing apparatus including object data store means containing information about the appearance and location of objects in an area to be viewed, sensor means arranged to view at least a part of the area, means for comparing an output of the sensor means with information in the data store means to identify an object viewed and to read out information about its location, means for providing information about the location of the sensor means, and means for calculating the range of the object from the information about the location of the object and the location of the sensor means.

According to a further aspect of the present invention there is provided image processing apparatus including object data store means containing information about the appearance and size of objects in an area to be viewed, sensor means arranged to view at least a part of the area, means for comparing an output of the sensor means with information in the data store means to identify an object viewed and to read out information about its size, means for deriving an indication of the angle subtended by the object at the sensor means, and means for calculating the range of the object from the information about its size and the angle subtended.

According to yet another aspect of the present invention there is provided image processing apparatus including store means arranged to store mapping information about an area to be viewed, sensor means arranged to view at least a part of the area, and means for comparing the output of the sensor means with the stored mapping information in respect of at least said part least of the area such as to identify the presence of an object viewed by the sensor means from its absence from the stored mapping.

The apparatus may include means for receiving aircraft navigation information, the apparatus being arranged to at least utilize said aircraft navigation information in determining the location of the object relative to the corresponding part of the stored mapping information.

The sensor means may include a television camera and may be infra-red sensor means.

According to another aspect of the present invention there is provided a method of image processing comprising the steps of: storing topographical mapping information about an area to be viewed; viewing with sensor means at least a part of the area in perspective; determining the line of sight of an object in the field of view; determining where the line of sight intercepts the stored topographical mapping; and determining the range of the object from its location relative to a corresponding part at least of the stored topographical mapping.

The method may include the steps of comparing an output from the sensor means with data about objects in the area to be viewed so as to identify objects viewed, and providing an output of information about the identified objects in accordance with said data. The method may include the steps of providing an output in respect of any new object viewed but not present in the data.

The stored information preferably includes information about the location of the objects in the area, information being provided in respect of the location of the sensor means, and an indication being provided of the range of the object identified by trigonometrical calculation from the information about the location of the object and the location of the sensor means.

The stored information may include information about the size of the object, the method including the steps of deriving an indication of the angle subtended by the object at the sensor means, and providing indication of the range of the object from the information regarding its size and the angle subtended.

The method may include the steps of deriving an indication of the angle subtended by the object at the sensor means, and providing an indication of the size of the object from the angle subtended and the range of the object from the sensor means.

According to another aspect of the present invention there is provided a method of image processing comprising the steps of: providing a store of information about the appearance and location of objects in an area to be viewed; viewing with sensor means at least a part of the area; comparing an output of the sensor means with the stored information about the object to identify an object viewed; reading out information about the location of the object; providing information about the location of the sensor means; and calculating the range of the object from the information about the location of the object and the location of the sensor means.

According to another aspect of the present invention there is provided a method of image processing comprising the steps of: providing a store of information about the appearance and size of objects in an area to be viewed; viewing with sensor means at least a part of the area; comparing an output of the sensor means with the stored information about the objects to identify an object viewed; reading out information about the size of the object; deriving an indication of the angle subtended by the object at the sensor means; and calculating the range of the object from the information about its size and the angle subtended.

According to another aspect of the present invention there is provided a method of image processing comprising the steps of: storing mapping information about an area to be viewed; viewing with sensor means at least a part of the area; comparing the output of the sensor means with the stored mapping information in respect of at least said part of the area; and identifying the presence of an object viewed by the sensor means from its absence from the stored mapping.

The sensor means may be mounted on an aircraft and the method include the step of utilizing aircraft navigation information in determining the location of the object relative to at least the corresponding part of the stored mapping information.

Image processing apparatus and its method of use, for an aircraft, according to be present invention, will now be described, by way of example, with reference to the accompanying drawings.

Figure 1:
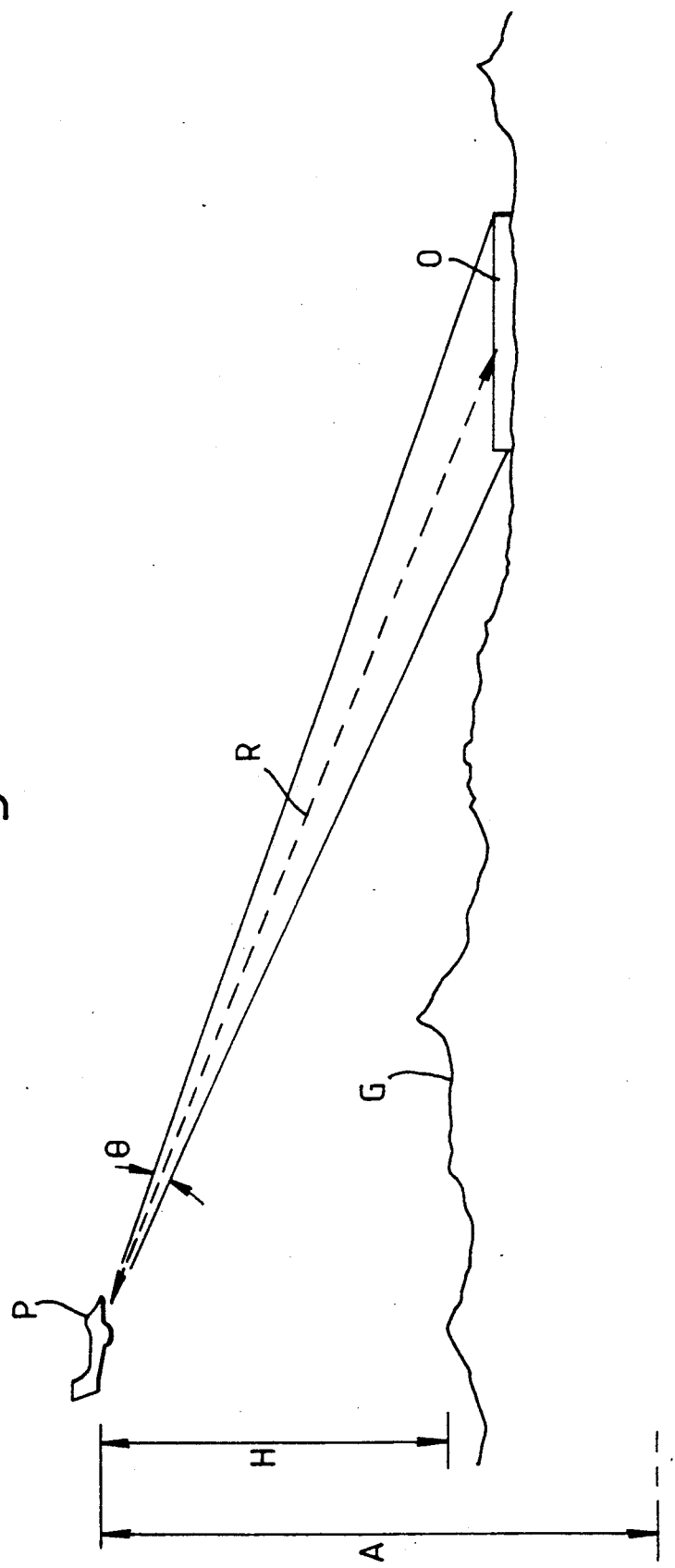
FIG. 1 is a side elevation view of the aircraft flying over ground.

With reference first to FIG. 1, the aircraft P is represented as flying at a height H above ground G and at an altitude A above mean sea level. The ground G is represented as having an uneven surface or topology. Image processing apparatus on the aircraft P is directed towards an object 0 on the ground G in front of the aircraft. The object is at a range R from the aircraft and subtends an angle $\theta$.

Figure 2:
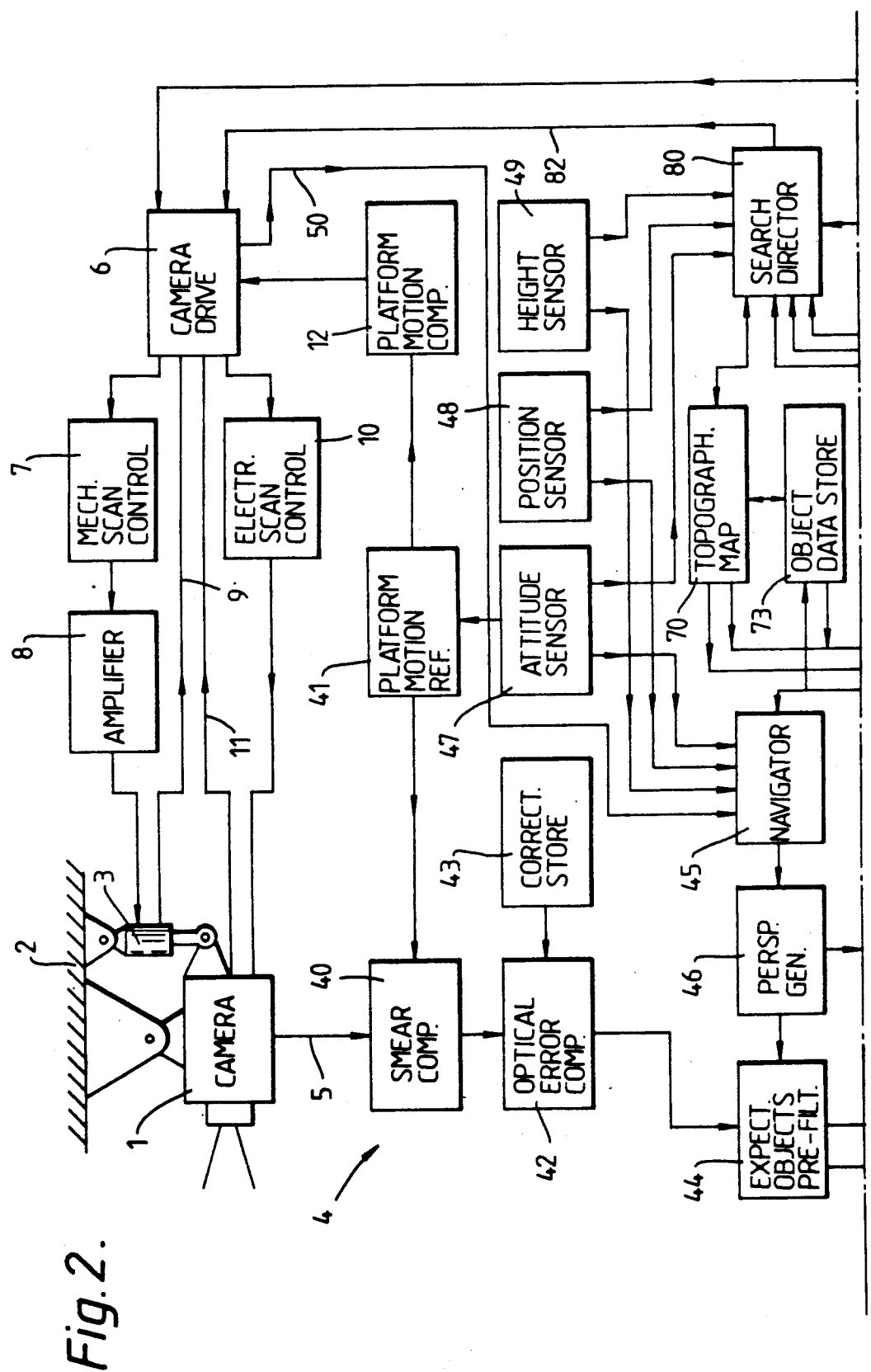
FIG. 2 is a schematic diagram of the apparatus.
Figure 2:
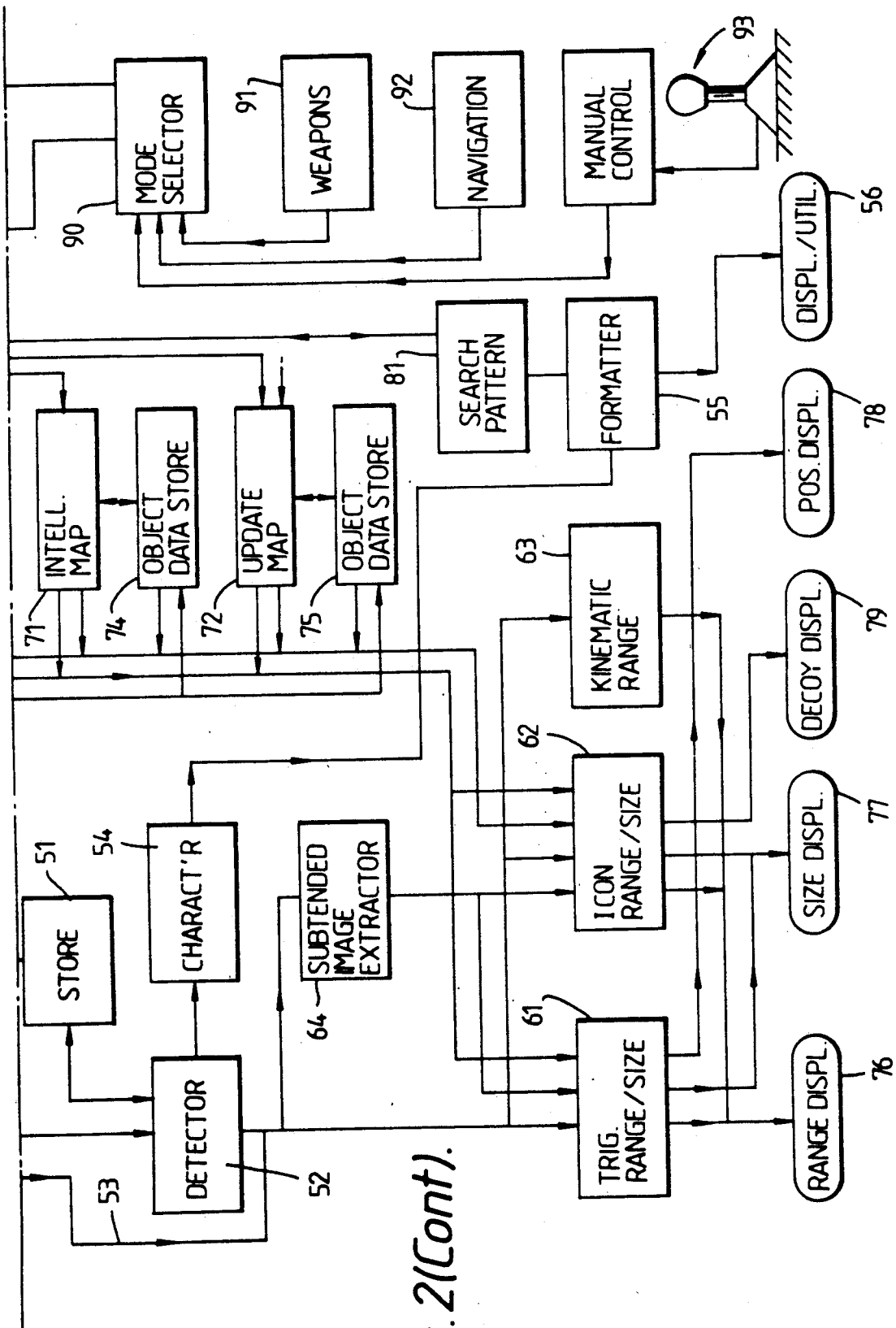

With reference now also to FIG. 2, the image processing apparatus includes an infra-red or other television camera 1 mounted on the aircraft structure 2 and the viewing angle of which is controlled by an actuator 3. Control of the viewing angle and scanning of the camera 1 is effected by a processing unit 4 which also receives the image output signals from the camera via line 5. The actuator 3 is driven by a camera drive unit 6 via a mechanical scan controller 7 and amplifier 8. Feedback is provided from the actuator 3 via line 9 to the drive unit 6. Electronic scanning is also controlled by the drive unit 6 via an electronic scan controller 10 with feedback via line 11.

The signals on line 5 are supplied to an image velocity smear compensator 40 which is controlled by the output of a platform motion reference system 41. The platform motion reference system 41 also provides an output to a platform motion compensation unit 12 which itself provides an output to the camera drive unit 6 so that the camera boresight is corrected for movement of the aircraft. The camera movement controls are of a high resolution and high frequency and may be mounted, with the camera 1, in a wing-mounted imaging pod. After velocity smear compensation, the image signals are passed to an optical error compensation unit 42 which compensates for lens defects and the like in accordance with data regarding these optical corrections contained in a store 43.

Following those two compensation steps, the signals are supplied to unit 44 which acts as an expected objects pre-filter 44. This pre-filter 44 receives inputs for comparison from object data stores 73, 74 and 75 via an object data store navigator 45. The stores 73, 74 and 75 contain data regarding the appearance of expected objects in plan, their size and location. The object data store navigator 45 receives information from an aircraft attitude sensor 47, position sensor 48 and height sensor 49 together with camera boresight feedback information via line 50 from the camera drive unit 6. The navigator 45 uses this information to identify the appropriate locations within the stores 73 to 75 likely to contain data on objects within the field of view of the camera 1. The attitude sensors 47 and position sensor 48 could be parts of an inertial navigation system. This data is supplied to the pre-filter 44 via an image perspective generator 46 which transforms the data store information into the same perspective as seen by the camera 1. The image generator 46 also supplies information about the stored image in perspective to another store 51.

After pre-filtering, an image comparator/object detector 52 makes further comparison of the image information with the perspective transformed image in the store 51. The detector 52 may employ conventional pattern recognition and matching techniques well known in image recognition. Image information about objects identified with sufficient certainty by the pre-filter 44 can be supplied directly to the output of the detector 52, via line 53. Information about a new object, that is, one which is present in the field of view of the camera 1 but absent from the object data stores 73 to 75, is supplied by the detector 52 to a new object characterizer 54. The characterizer 54 provides an output via a formatter 55 to a display 56, or other utilization device, by which information regarding the characteristics of the new object are presented. This may indicate the presence of a likely threat to the aircraft because of its unknown nature.

The detector 52 provides outputs in respect of identified objects to a trigonometric range and size processor 61, an iconometric range and size processor 62 and a kinematic range processor 63. An output is also provided to a subtended image extractor 64 which calculates the angle subtended at the camera 1 by the object viewed and supplies this information to the processors 61 and 62.

The processors 61 and 62 also receive inputs from a topographical map 70, a pre-loaded intelligence map 71 and a new object and update map 72 which are associated with respective ones of the object data stores 73 to 75. The topographical map 70 contains information about the topography, that is, ground contours and permanent features on the ground on which is superimposed the information about the location of other objects which may be more transient. The intelligence map 71 contains additional information about the location of objects within the topographical map which may be gathered and loaded just prior to the flight to bring up to date the map information. The new object and update map 72 and its associated data store 75 is supplied with information from external sources (not shown) such as data links, crew inputs or the new object characterizer 54. The crew input could, for example, include a helmet-mounted sight and a speech recognizer so that the sight could be aimed at a target which is then vocally named by the pilot. Information about the appearance of the named object would then be read out of the store 75 for use in subsequent target tracking.

Each of the maps 70 to 72 provides an output to a search director unit 80 which directs the camera 1 towards a region most likely to contain an object of interest. The search director 80 also receives inputs from the attitude sensor 47, position sensor 48 and height sensor 49, together with the output from a unit 81 by which new object search patterns can be defined by the user. The search director 80 provides an output via line 82 to the camera drive unit 6.

The trigonometric range/size processor 61 receives from the detector 52 information about the viewing angle of the object, that is, the camera bore sight alignment, and the present aircraft position and height. The object is assumed to be at the point where the boresight intercepts the topography as contained in the map 70. From this information, the processor 61 calculates, by trigonometry, the range of the aircraft to the object and supplies this information to a display of range at 76. If the object subtends a measurable angle, as determined by the subtended image extractor 64, the processor 61 calculates trigonometrically the size of the object, from the range information and the subtended angle. The size information is supplied to a display of size at 77. This information about range and size can be provided even if the nature of the object is unknown. It will be appreciated that there is a degree of ambiguity because the assumption must be made that the object is located on the ground, whereas this might not be the case. The processor 61 also provides an output to a position display 78 to indicate, to the user, the location of the observed object.

Where the nature of the object is known, because it is matched with an object in the data stores 73 and 75, a similar trigonometrical calculation is made by the processor 61. Further calculations, however, are also made. If the map position of the object is unambiguous, that is, there is only one location of the identified object in the data store, then the location of the object is known from the stored information about the object and without the need for information about the boresight attitude. The trigonometrical processor 61 calculates the range to the object by trigonometry from this information. If the position of the object is ambiguous, the range is determined using knowledge of the boresight attitude as previously.

The iconometric processor 62 also provides an indication of object range where the nature of the object, and hence its real size, has been identified and where the angle subtended by the object is measurable. This information enables the range of the object to be calculated by simple iconometric trigonometry. The stored information about the size of a known object can be compared with the size determined by the trigonometric processor 61 for checking purposes.

The system can also be used for determining the size and range of airborne targets. If these are identified, and therefore have a known size, their range can be calculated by the iconometric processor 62 from knowledge of the angle subtended by the object at the camera 1. Where the real size of the object is not known, the kinematic range processor 63 tracks the airborne object and calculates an- approximate range from knowledge of the movement of the viewing aircraft and the change in bearing of the target from the viewing aircraft. This calculation can only be probabilistic by virtue of the mathematics involved. The iconometric processor 62 can also provide an output to a decoy display 79 if the camera 1 sees an object which resembles in appearance a stored object but has a size that is less than that of the stored object. For example, an airborne object which is smaller than a conventional manned aircraft would be indicated as a decoy.

The camera drive 6 is coupled to a mode selector 90 by which input from a weapons system 91, a navigation system 92 or a manual control 93 is selected. The weapons system 91 may be a weapons homing head to which the camera 1 is slaved.

Figure 3:
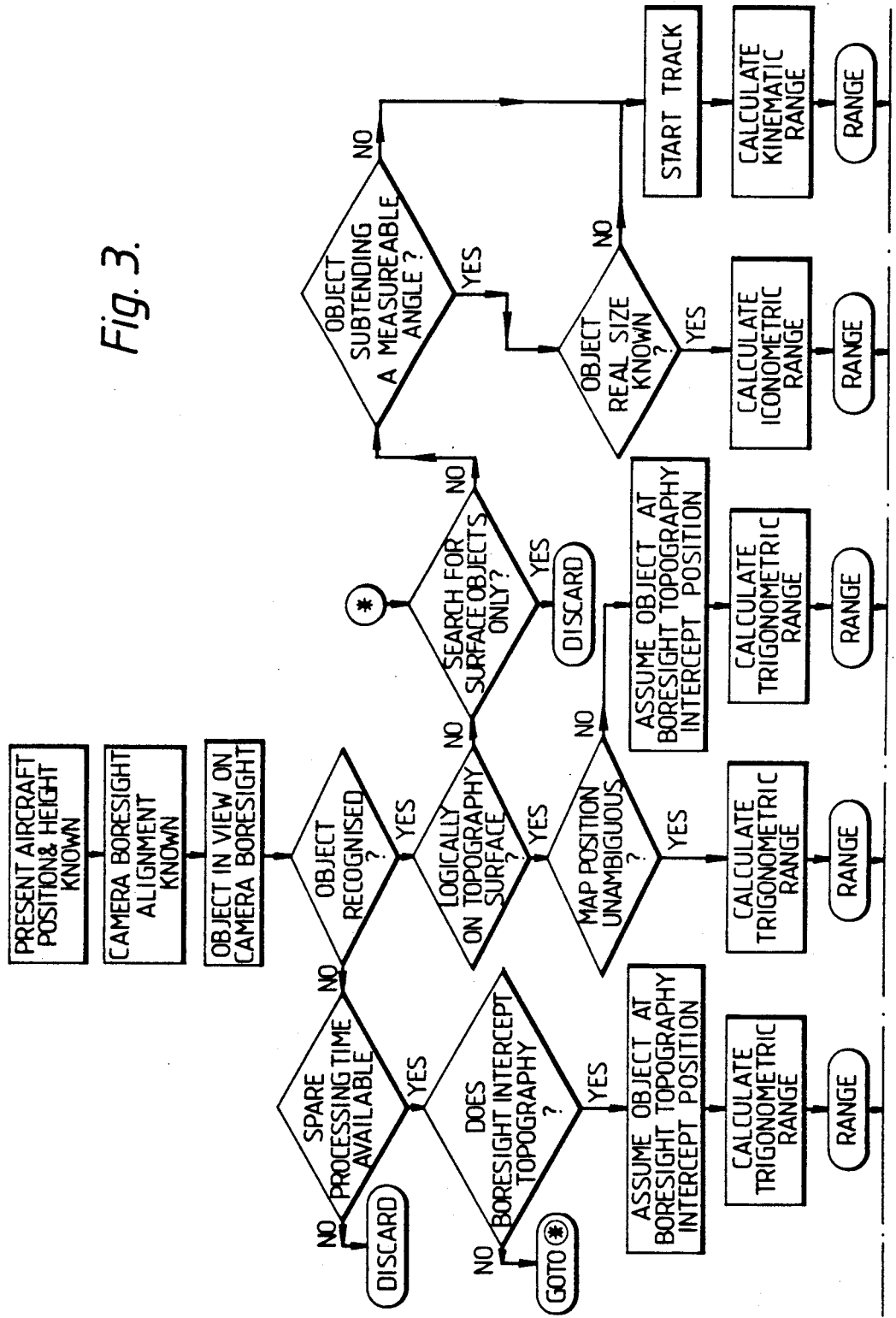
FIG. 3 is a flow diagram illustrating operation of the apparatus.
Figure 3:
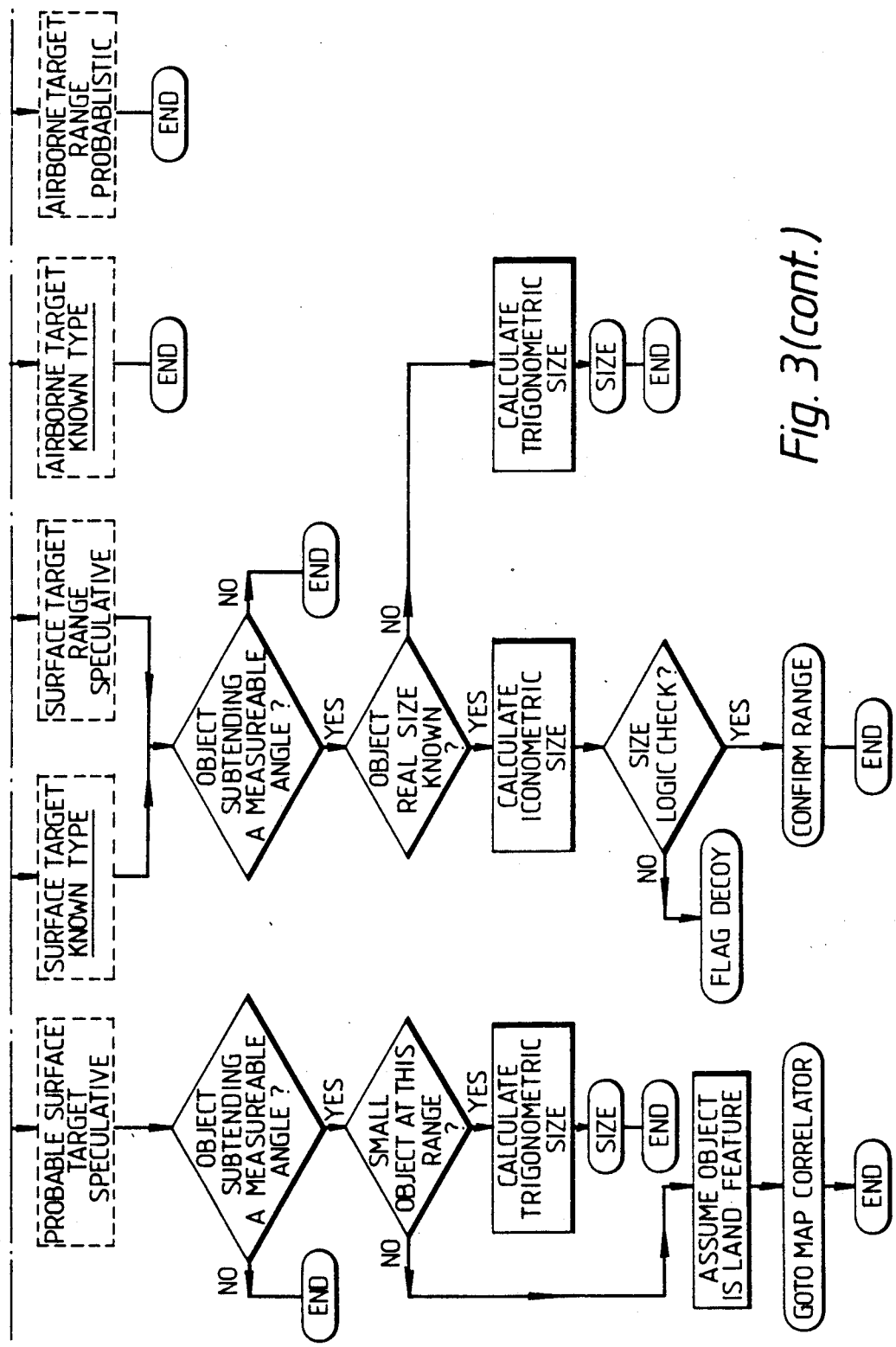

The method of use of the apparatus is further clarified by the flow chart of FIG. 3 which is self explanatory.

The apparatus has the advantage of enabling the range and size of an object to be determined solely by passive means and without making the presence of the aircraft apparent to the object.

What I claim is:

1. Image processing apparatus comprising: data store means for storing topographical mapping about an area to be viewed; sensor means arranged to view at least a part of the area in perspective and to derive information as to the location of an object in the field of view of said sensor means; said image processing apparatus including an object data store containing information about objects in the area to be viewed, comparator means, and means connecting said comparator means with said object data store and said sensor means, said comparator means being operative to compare an output of said sensor means with the contents of said object data store so as to identify an object viewed and to provide an output of the information in said object data store in accordance therewith, the information in said object data store including information about the location of the objects in the area, said apparatus including means for providing information in respect of the location of said sensor means, processor means, and means for supplying the information about the location of the object and the location of said sensor means to said processor means, said processor means being operative to calculate by trigonometry the range of the identified object from the information about the location of the object and the location of said sensor means.

2. Image processing apparatus according to claim 1, wherein said comparator means provides an output in respect of any new object viewed but not present in said object data store means.

3. Image processing apparatus according to claim 1, wherein said object data store contains information about the size of the objects in the area, said apparatus including a unit that derives an indication of the angle subtended by the identified object at said sensor means, processor means, means supplying an indication of the size of the object from said object data store to said processor means, and means supplying to said processor means an indication of the angle subtended by the object, said processor means being operative to provide an indication of the range of the object from information regarding its size and the angle subtended.

4. Image processing apparatus according to claim 1, wherein the apparatus includes a unit that derives an indication of the angle subtended by the object at said sensor means, said apparatus being arranged to provide an indication of the size of the object from information about the angle subtended and the range of the object from said sensor means.

5. Image processing apparatus comprising: an object data store containing information about the appearance and location of objects in an area to be viewed; sensor means arranged to view at least a part of the area; comparator means; means connecting said comparator means with said object data store and said sensor means said comparator means being operative to compare an output of said sensor means relating to appearance of an object with information in said object data store relating to the appearance of an object to identify an object viewed and to read out information about its location; means for providing information about the location of said sensor means; processor means; and means supplying to said processor means information about the location of the object and the location of said sensor means, said processor means being operative to calculate the range of the object from the information about the location of the object and the location of said sensor means.

6. Image processing apparatus according to claim 1, wherein said sensor means includes a television camera.

7. A method of image processing comprising the steps of: storing topographical mapping information about an area to be viewed; viewing with sensor means at least a part of the area in perspective; providing data about objects in the area to be viewed, comparing an output from the sensor means with said data so as to identify objects viewed, providing an output of information about the identified objects in accordance with said data, storing information about the location of the objects in the area, providing information in respect of the location of the sensor means, and providing an indication of the range of an identified object by trigonometrical calculation from the information about the location of the object and the location of the sensor means.

8. A method according to claim 7, including the step of providing an output in respect of any new object viewed but not present in said data.

9. A method according to claim 7, wherein the said stored information includes information about the size of the object, said method including the steps of deriving an indication of the angle subtended by the object at the sensor means, and deriving an indication of the range of the object from said information regarding its size and the angle subtended.

10. A method of image processing according to claim 7, including the steps of deriving an indication of the angle subtended by the object at the sensor means, and utilizing the angle subtended and the range of the object from the sensor means to provide an indication of the size of the object.

11. A method of image processing comprising the steps of: providing a store of information about the appearance and location of objects in an area to be viewed; viewing with sensor means at least a part of the area; comparing an output of the sensor means relating to the appearance of an object with the stored information about the appearance of objects in the area to identify an object viewed; reading out of said store information about the location of the object; providing information about the location of the sensor means; and calculating the range of the object from the information about the location of the object and the location of the sensor means.

* * * * *